United States Patent [19]
Hoffman et al.

[11] 3,836,763
[45] Sept. 17, 1974

[54] VEHICLE LIGHTING UNIT ASSEMBLY

[75] Inventors: John J. Hoffman, Spring Arbor; Jay E. White, Jr., Southfield, both of Mich.

[73] Assignee: Woodall Industries Inc., Detroit, Mich.

[22] Filed: Oct. 12, 1973

[21] Appl. No.: 405,773

[52] U.S. Cl................ 240/41.6, 240/7.1 R, 240/44
[51] Int. Cl............................................. F21v 7/00
[58] Field of Search....... 240/41.6, 44, 41 SB, 41 R, 240/7.1 R

[56] References Cited
UNITED STATES PATENTS

| | | | |
|---|---|---|---|
| 2,733,335 | 1/1956 | Falge ................................... | 240/44 |
| 2,826,682 | 3/1958 | Falge ................................... | 240/41.6 |
| 2,868,961 | 1/1959 | Worden ............................... | 240/44 |
| 2,910,575 | 10/1959 | Meschwitzer et al................. | 240/44 |
| 2,911,523 | 11/1959 | Falge et al. ......................... | 240/41.6 |
| 3,493,740 | 2/1970 | Onksen............................... | 240/44 |

*Primary Examiner*—Richard L. Moses
*Attorney, Agent, or Firm*—Collins, Oberlin & Darr

[57] ABSTRACT

A vehicle lighting unit assembly of the adjustable type including a generally cup-shaped housing having a frontal opening surrounded by a rim on which a sealed beam head lamp is seated. Radially outwardly projecting surfaces are provided on the housing adjacent the opening therein and cooperate with lugs provided on a separate retaining ring to clamp the head lamp between the ring and the housing rim when the ring is turned or rotated in one direction relative to the housing. Portions of a locking device are provided on one of the surfaces and its cooperating lug to prevent rotation of the ring in the opposite direction after the desired clamped position is obtained.

11 Claims, 9 Drawing Figures

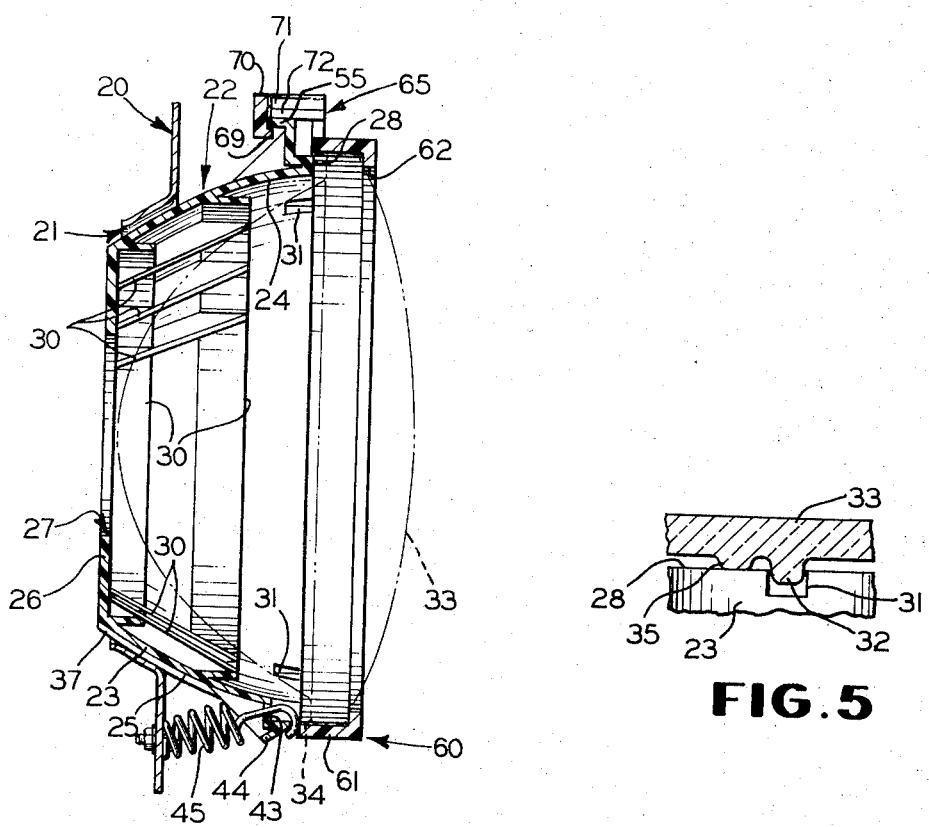
FIG. 3
FIG. 5
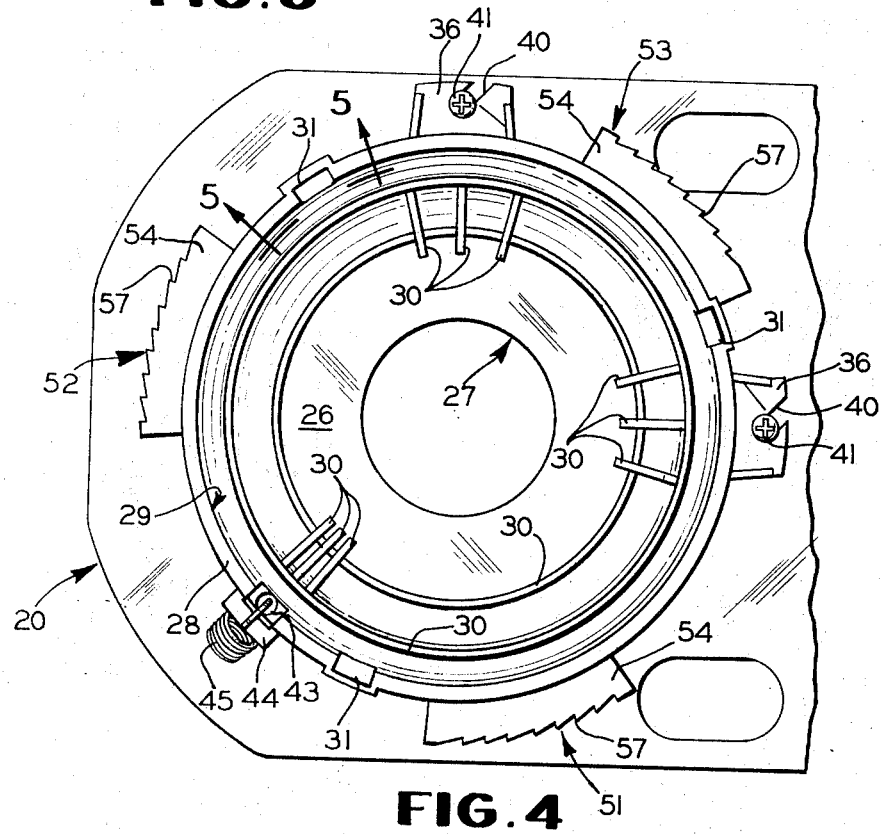
FIG. 4

VEHICLE LIGHTING UNIT ASSEMBLY

This invention relates generally to lighting unit assemblies and, more particularly, to a vehicle head lamp mounting of the adjustable type for permitting a limited amount of angular adjustment of the optical axis of the head lamp both vertically and horizontally for lamp aiming purposes.

In the mounting of sealed beam head lamps on automobiles, it is conventional to utilize a three-piece mounting which includes a fixed bracket on the automobile, a metal, generally cup-shaped adjustable body portion which is mounted on the fixed bracket and has recesses for engaging the locating lugs on the flange of the sealed beam head lamp, and a retaining ring or bezel that is provided on the exterior of the head lamp to hold the head lamp against the adjustable body portion.

In order to replace a burned out head lamp, it is necessary to first remove the metal retaining ring normally held in position by three screws located about the periphery of the body portion. This of course requires a screwdriver or other similar elongated thin-edged tool and is often made further difficult by rust since these parts tend to oxidize upon weathering.

Among the objects of the present invention is the provision of a lamp housing and retaining ring both of which are preferably molded plastic, with the retaining ring being capable of removal by only a simple turning movement thereof after a locking mechanism has been disengaged, this latter step requiring no special tools or the like.

Another object of the invention is to provide a vehicle head lamp mounting which utilizes a minimum number of parts, substantially none of which are subject to rust, and which accurately retains the sealed beam head lamp in the desired aimed position.

Briefly stated, in accordance with one embodiment of the invention, the lighting unit assembly comprises an apertured support bracket and a generally cup-shaped lamp-receiving housing extending partially through the aperture in the support bracket and being adjustably seated and secured therein. The housing includes a rim which defines a front opening therein at that portion of the housing of largest circumference, the axis of which opening extends in the same general direction as the axis of the aperture. Lamp seating means are provided on the housing in and adjacent the rim for positioning the sealed beam head lamp in place with its axis extending in the direction of the axis of the housing opening.

At three or more circumferentially spaced points on the housing, ear-like projections are provided. These projections are generally L-shaped and comprise a first leg extending radially outwardly from the periphery of the housing and circumferentially thereof adjacent the opening in the housing and a second leg, coextensive with the first, extending axially of and towards the rear of the housing. This leg is tapered, i.e., extends further rearwardly adjacent one of its ends than the other. In addition, at least one and preferably all of the projections are stepped or notched along their periphery to form the toothed bar portion of a ratchet-type locking means.

In this latter connection, a retaining ring for securing the sealed beam head lamp within the housing in seated position is provided and has three or more generally U-shaped lugs extending therefrom and circumferentially spaced apart the same distance as the ear-like projections. One leg of the lugs projects radially outwardly, with the web extending axially of the ring and the other leg projecting downwardly on the opposite side of the ear-like projections from the first leg. In this manner, rotation of the ring will tighten it on the housing due to the co-action between the lug leg and the tapered ear leg and this in turn clamps the lamp between the ring and the housing rim. In addition, the web portion of one of these lugs is punched out to provide a downwardly depending hinged portion which forms the pawl of the previously mentioned ratchet-type locking means and cooperates with the notched surface of the ear-like projection co-acting with same to lock the ring in place.

Other objects and advantages of the invention will become more apparent during the course of the following description when taken in connection with the accompanying drawings.

In the drawings, wherein like numerals are employed to designate like parts throughout the same:

FIG. 3 is a cross-sectional view taken along the line 3—3 of FIG. 2;

FIG. 4 is a front elevational view of the assembly with the retaining ring and lamp removed therefrom;

FIG. 5 is a cross-sectional view taken along the line 5—5 of FIG. 4 but illustrated with a sealed beam head lamp in position;

Figure 1:
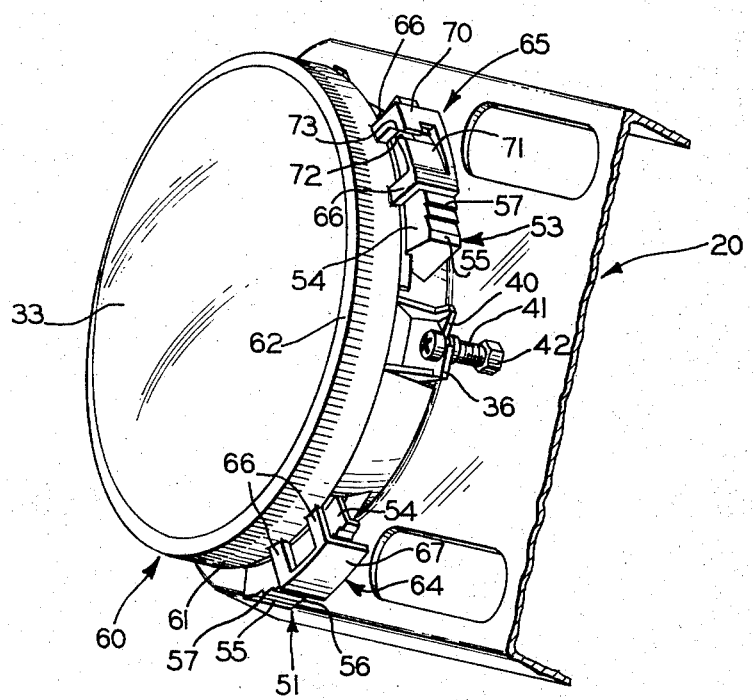
FIG. 1 is a perspective view of a lighting assembly embodying the present invention.
Figure 2:
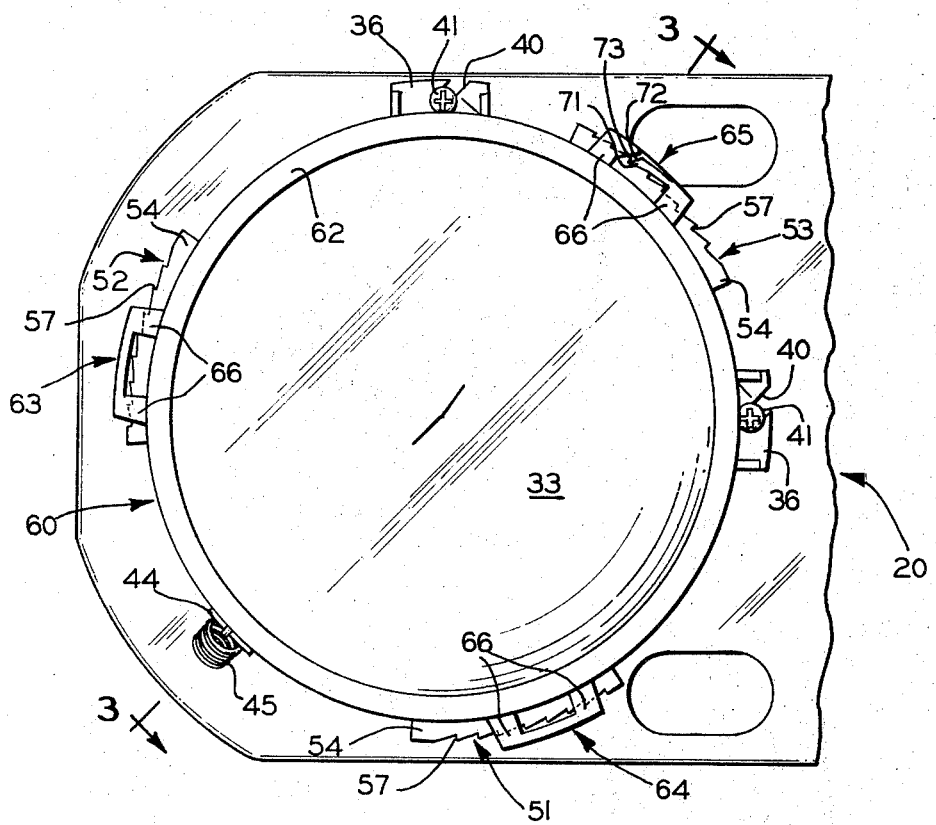
FIG. 2 is a front elevational view of the assembly.
Figure 6:
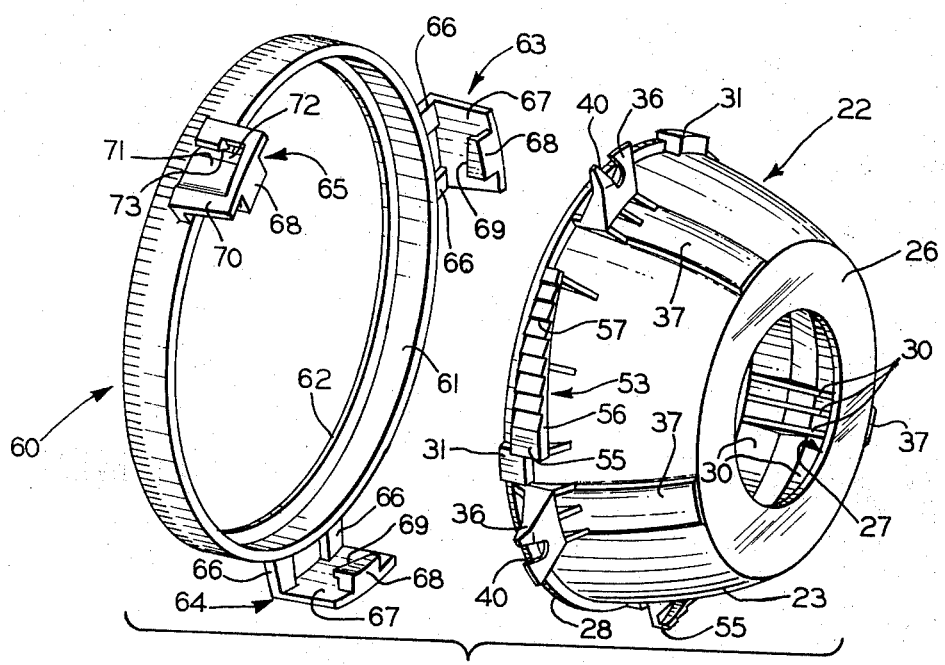
FIG. 6 is an exploded perspective view of the housing and retaining ring in accordance with the invention.
Figure 7:
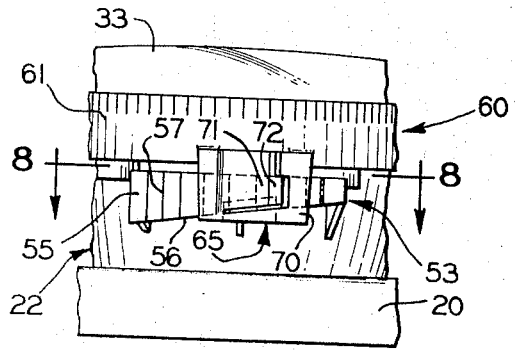
FIG. 7 is a fragmentary elevational view illustrating the locking means for maintaining the ring and housing in assembled position.
Figure 8:
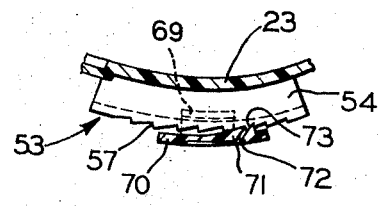
FIG. 8 is a cross-sectional view taken along the line 8—8 of FIG. 7.
Figure 9:
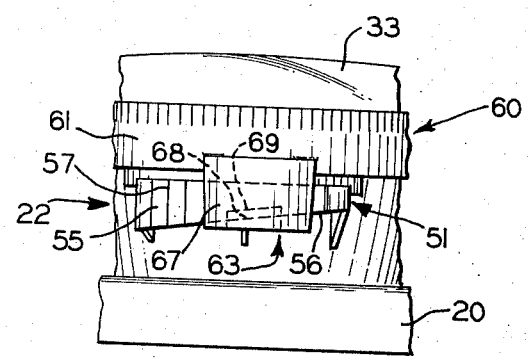
FIG. 9 is a fragmentary elevational view of the retaining ring and housing in assembled position and particularly illustrating one of the fastening lugs.

Referring now more particularly to the drawings, there is illustrated in FIG. 1 the head lamp mounting in accordance with the invention comprising a bracket 20 which may be the conventional bracket that forms a part of an automobile and includes a circular opening or aperture 21 (FIG. 3) formed therein. A generally cup-shaped housing 22 preferably formed of a synthetic plastic, e.g., a 25 to 40 percent glass filled polypropylene, is seated in the opening 21 and includes a thin annular wall 23 that has paraboloidal inner and outer surfaces 24 and 25, respectively. One end of the housing 22 is formed with a radially inwardly extending wall 26 that defines a rear opening 27 in the housing. At the other or forwardly disposed end of the housing a radially outwardly extending flange or rim 28 is provided defining a front opening 29 in the housing. A plurality of ribs 30 are molded into the housing and serve to reinforce and stiffen same.

As shown in FIGS. 4 and 5, recesses 31 are formed in the rim 28 at spaced points thereabout. These recesses are for the purpose of accepting locating lugs 32 conventionally provided on S.A.E. standard sealed beam head lamp units such as that shown at 33, and more particularly on the inner surface of an annular lip 34 of the head lamp, to circumferentially locate the head lamp. In this connection, bearing pads 35 are also provided on the head lamp lip and rest against the rim 28 to support the head lamp when the latter is positioned in the housing for proper aiming.

A pair of mounting lugs 36 are provided at points spaced 90° apart about the circumference of and adjacent the front of the housing 22, such lugs extending radially outwardly from ribs 37 formed on the outer surface 25 of the housing. The ribs 37 engage portions of the bracket 20 defining the opening 21 and thus provide the seating means for the housing.

The mounting lugs 36 have slots 40 cut therein for engaging the heads of screws 41 that are threaded into nuts 42 fixed to the bracket 20. At a point circumferentially approximately midway between the lugs 36, an opening 43 is provided in a flanged portion 44 of the housing, which flange portion also extends from a rib 37. One end of a spring 45 is hooked in the opening 43 with the other end being fixed to the bracket. In this manner then, the housing 22 is yieldingly held against the bracket 20 and by threading the screws 41 inwardly and outwardly, the housing, and in turn the sealed beam head lamp 33 mounted therein, can be aimed.

Three generally L-shaped, ear-like protuberances 51, 52 and 53 project radially outwardly from the housing 22 adjacent the rim 28 thereof at points substantially equally spaced about the periphery. Each of the protuberances comprise a first leg 54 extending radially outwardly from the housing and for a distance circumferentially thereof, and a second leg 55 coextensive with the first and extending axially of and towards the rear of the housing. The legs 55 also have their rear edges 56 tapered, that is the legs exend further rearwardly adjacent one of their ends than the other.

In the embodiment illustrated, the leg 55 of each of the protuberances has notches or teeth 57 cut into its upper surface along the length thereof to form the toothed bar portion of a ratchet-type locking means, as will hereinafter be more fully described.

The head lamp 33 is secured in place in seated position on the rim 28 of the housing by means of a retaining ring 60. The retaining ring 60, preferably formed of a strong synthetic plastic such as a polycarbonate or, as previously mentioned with regard to the housing 22, a glass fiber reinforced polypropylene, includes a cylindrical body portion 61 and a radially inwardly directed flange 62 adapted to engage the lip 34 of the head lamp.

Extending from the body portion 61 at three equally spaced points about the circumference of the ring 60 are generally U-shaped lugs 63, 64 and 65. The lugs 63 and 64 are identical and comprise legs or posts 66 extending radially outwardly from the body portion, webs 67 extending axially rearwardly of the ring, and legs 68 depending from the webs. The legs 68 are wedge-shaped, being of greater axial dimension at one end thereof than the other, and include a forwardly extending projection or keeper flange 69.

The lug 65 is identical to the lugs 63 and 64 except for the web position thereof. Thus the web 70 of the lug 65 is punched out to provide an inwardly biased hinged portion or catch 71 which forms the pawl of the previously mentioned ratchet-type locking means. The free end of the catch 71 is tapered as shown at 72 and cooperates with a mating, tapered ledge 73 formed on the web 70 to provide a stop for the catch when it is pried upwardly for release from the teeth 57.

In accordance with the invention, the retaining ring 60 holds the sealed beam head lamp 33 in the desired aimed position with the housing 22 by engagement of the lugs 63, 64 and 65 with the protuberances or ears 51, 52 and 53. Thus, it is only necessary in assembling the head lamp in the housing to first position the ring with the lugs 63, 64 and 65 thereof just to the counterclockwise side of the ears 51, 52 and 53 (looking from the front of the unit) with the flange 62 abutting against the lip 34 of the head lamp. Manual rotation of the ring clockwise will then cause the legs 68 of the lugs to pass behind the legs 55 of the ears and continued rotation will bring them into contact and pull the ring toward the housing due to the co-action of the wedge-shaped legs 68 and tapered rear edges 56 of the legs 55. This in turn will clamp the lip 34 of the head lamp tightly between the flange 62 and the rim 28 of the housing. The projections 69 formed on the legs 68 hook under the legs 55 and serve to maintain proper position and contact between the legs during rotation.

As the retaining ring 60 is rotated, the hinged portion or pawl 71 of the lug 65 will spring into each succeeding notch 57 formed in the upper surface of the leg 55 of the particular protuberance with which it is associated. In the embodiment illustrated, this is the protuberance 53. When the point is reached at which further clockwise rotation to the next succeeding notch is not possible, engagement of the pawl with the notch it is then in contact with or has just passed, will prevent any counterclockwise rotation of the ring and thus lock the ring and head lamp in place.

When it becomes desirable to replace the head lamp 33, the retaining ring 60 may be readily removed by lifting the pawl 71 from the notch it is in engagement with and simultaneously rotating the ring counterclockwise. In this respect, the pawl may be lifted or sprung out of the notch by inserting any relatively thin rigid article, for example a pen knife, key, pencil, screwdriver, or the like into the space between the posts 66 of the lug 65 and prying upwardly on the pawl. Contact of the tapered end 72 of the pawl with the ledge 73 prevents the pawl from being lifted too far and thus broken off or cracked.

As hereinbefore indicated, it is only essential that the upper surface of one of the legs 55 of the protuberances be notched. However, with this construction care must be taken that the lug 65 or pawl-containing lug be associated with the notched protuberance in assembling the ring on the housing to assure that locking of the two takes place.

The number of ears on the housing and cooperating lugs on the retaining ring is dependent principally on the diameter of the lamp and housing opening therefor. In this respect, three such ears and lugs are preferred for the 5-¾ inch bulb while four have been found to provide an excellent structure when the unit is designed to receive a 7-inch bulb.

We claim:

1. A lighting unit assembly comprising, in combination, an apertured support bracket, a lamp-receiving housing extending through the aperture in said support bracket and seated therein, said housing having an opening surrounded by an integral radially outwardly extending rim, a lamp seated on said rim and having a substantial portion of its body extending through said opening in said housing, at least three surfaces projecting from the periphery of said housing at spaced points thereabouts and including a portion which is tapered peripherally of the housing to be wider in a direction axially of said opening adjacent one end than the other, a retaining ring surrounding and in engagement with the seated portion of the lamp and having at least three lugs extending therefrom, said lugs each including an area which cooperates with one of said tapered portions of said surfaces to clamp said lamp between said housing rim and said ring when said ring is turned relative to said housing, and locking means for maintaining said lamp in said clamped position and preventing turning of said ring in a direction opposite to that it is turned in clamping said lamp.

2. A lighting unit assembly comprising, in combination, an apertured support bracket, a generally cup-shaped lamp receiving housing extending through the aperture in said support bracket and seated therein, said housing having a generally circular frontal opening surrounded by an integral radially outwardly extending rim, a lamp seated on said rim and having a substantial portion of its body extending rearwardly into said housing, at least three surfaces projecting radially outwardly from the periphery of said housing at circumferentially spaced points and including a portion which is tapered circumferentially of the housing to be wider in an axial direction adjacent one end than the other, a retaining ring surrounding and in engagement with the seated portion of the lamp and having at least three lugs extending therefrom, said lugs each including a portion which extends rearwardly of and cooperates with one of said tapered portions of said surfaces to clamp said lamp between said housing rim and said ring when said ring is rotated relative to said housing, and locking means for maintaining said lamp in said clamped position and preventing rotation of said ring oppositely to the clamping rotation.

3. A lighting unit assembly as defined in claim 1, wherein said locking means is a ratchet-type mechanism including a pawl member associated with one of said lugs and a toothed portion formed on one of said surfaces.

4. A lighting unit assembly as defined in claim 3, wherein each of said surfaces includes a toothed portion formed thereon and effective with said pawl member to provide said locking means.

5. A lighting unit assembly as defined in claim 1, wherein said housing and said retaining ring are formed of a synthetic plastic material.

6. A lighting unit assembly as defined in claim 1, wherein said surfaces are generally L-shaped and include a first leg projecting radially outwardly from the periphery of said housing and a second leg extending axially of and toward the rear of said housing, with the tapered portion of said surface being the rear edges of said second legs.

7. A lighting unit assembly as defined in claim 1, wherein said lugs are generally U-shaped and include one leg which projects radially outwardly from the ring, a web portion which extends axially rearwardly of the ring, and another leg which depends radially inwardly from the web behind said tapered portion of said surfaces.

8. A lighting unit assembly as defined in claim 7, wherein said last-mentioned leg is tapered oppositely to said tapered portion of said surfaces so as to pull the ring toward the housing during said relative turning.

9. A vehicle head lamp assembly comprising, in combination, an apertured support bracket, a generally cup-shaped lamp-receiving housing extending partially through the aperture in said support bracket and seated therein, said housing having a rim defining a frontal opening therein at that portion of the housing of largest circumference, the axis of which opening extends in the same general direction as that of said aperture, at least three generally L-shaped circumferentially extending and spaced ears each including a first leg projecting radially outwardly from the periphery of said housing and a second leg extending axially of and towards the rear of said housing, the rear edge of each of said second legs being tapered such as to be wider in the direction axially of the housing at one end than the other, a plurality of notches formed in and spaced along the length of said second legs, lamp seating means on said housing adjacent said rim for positioning the lamp thereon with its axis extending generally in the direction of the axis of said opening, a retaining ring securing said lamp within said housing in seated position, said retaining ring having at least three generally U-shaped lugs extending therefrom and spaced apart the same distance as said ears, one leg of each of the lugs projecting radially outwardly from the ring with the web portion extending axially rearwardly of the ring and the other leg depending radially inwardly from the web to the rear of said ears, each of said other legs being tapered so as to cooperate with said tapered rear edges of said second ear legs to pull the ring towards the housing and clamp the lamp between the housing rim and said ring upon rotation of said ring relative to the housing, a locking element depending from the web portion of one of said lugs comprising a pawl, and means urging said pawl into engagement with each successive one of said notches passed during said rotation of said ring and preventing rotation in the opposite direction.

10. A vehicle head lamp assembly as defined in claim 9, wherein said retaining ring comprises a cylindrical body portion and a radially inwardly directed flange adapted to engage the lamp when seated and clamped in said housing.

11. A vehicle head lamp assembly as defined in claim 9, wherein said locking element is adapted to be moved out of said notches to permit said rotation in the opposite direction when it is desired to remove said lamp from said housing.

* * * * *